(12) United States Patent
Takahashi et al.

(10) Patent No.: US 6,798,108 B2
(45) Date of Patent: Sep. 28, 2004

(54) ALTERNATOR INCLUDING CASE WITH OPEN PORTION FOR BRUSH REMOVAL

(75) Inventors: Tomoki Takahashi, Tokyo (JP); Hideki Morikaku, Tokyo (JP); Yoshihito Asao, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/988,286

(22) Filed: Nov. 19, 2001

(65) Prior Publication Data

US 2002/0113505 A1 Aug. 22, 2002

(30) Foreign Application Priority Data

Feb. 6, 2001 (JP) ........................................ 2001-029717

(51) Int. Cl.[7] .............................................. H02K 13/00
(52) U.S. Cl. ...................................................... 310/239
(58) Field of Search ........................... 310/239, 89, 263, 310/240

(56) References Cited

U.S. PATENT DOCUMENTS

| | | | | |
|---|---|---|---|---|
| 1,651,059 A | * | 11/1927 | Janette ........................ | 310/249 |
| 2,194,620 A | * | 3/1940 | Sekyra ........................ | 310/247 |
| 3,603,824 A | * | 9/1971 | Csaki ......................... | 310/71 |
| 4,705,983 A | | 11/1987 | Franz et al. .............. | 310/68 D |
| 4,959,576 A | | 9/1990 | Horibe et al. ............... | 310/239 |
| 5,550,418 A | | 8/1996 | Chung ......................... | 310/239 |
| 5,955,810 A | * | 9/1999 | Umeda et al. ............... | 310/208 |
| 5,990,594 A | * | 11/1999 | Hyatt, Jr. et al. ........... | 310/249 |
| 6,215,211 B1 | | 4/2001 | Harris et al. .................. | 310/43 |
| 6,294,856 B1 | | 9/2001 | Ishida et al. ................ | 310/232 |
| 6,356,003 B1 | * | 3/2002 | Fiorenza et al. ............ | 310/179 |

FOREIGN PATENT DOCUMENTS

| | | | | |
|---|---|---|---|---|
| DE | 198 20 885 A1 | 11/1999 | ............ | H02K/5/14 |
| JP | 51-66409 | 6/1976 | .......... | H01R/39/39 |
| JP | 51-87205 | 7/1976 | .......... | H01R/39/40 |
| JP | 04-137378 | 5/1992 | .......... | H01R/39/38 |
| JP | 08-251889 | 9/1996 | .......... | H02K/19/36 |

* cited by examiner

*Primary Examiner*—Dang Le
(74) *Attorney, Agent, or Firm*—Sughrue Mion, PLLC

(57) ABSTRACT

An automotive alternator includes a case, a rotor disposed inside the case, the rotor including a rotor coil and claw-shaped magnetic poles covering the rotor coil, the claw-shaped magnetic poles being magnetized into North-seeking (N) and South-seeking (S) poles by a magnetic flux, a stator including a stator core provided with slots and a stator winding mounted to the stator core, brushes for supplying electric current from an electric power supply to the rotor coil, and a brush holding assembly secured to the case, the brush holding assembly being provided with a cover and a holding portion for holding the brushes within the holding portion, an open portion for removal and insertion of the brushes being formed at a position on the case facing the cover.

8 Claims, 19 Drawing Sheets

FIG. 8A
FIG. 8B
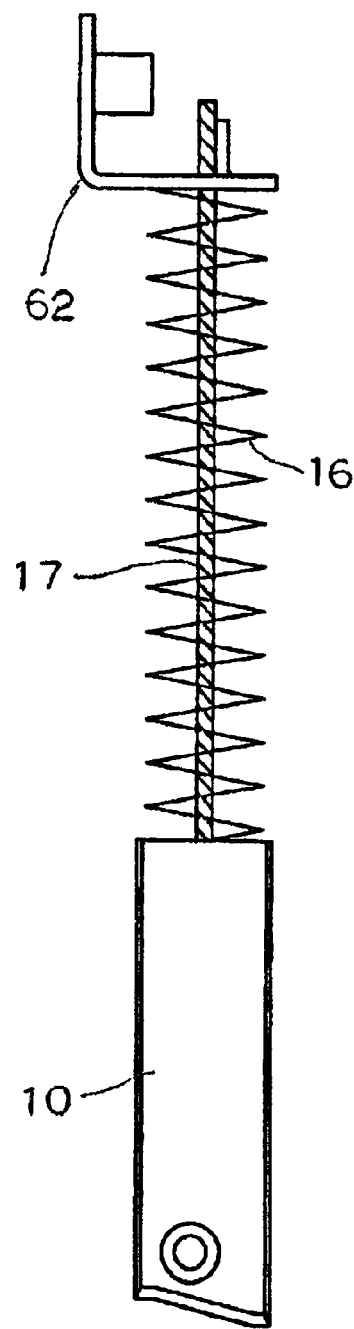
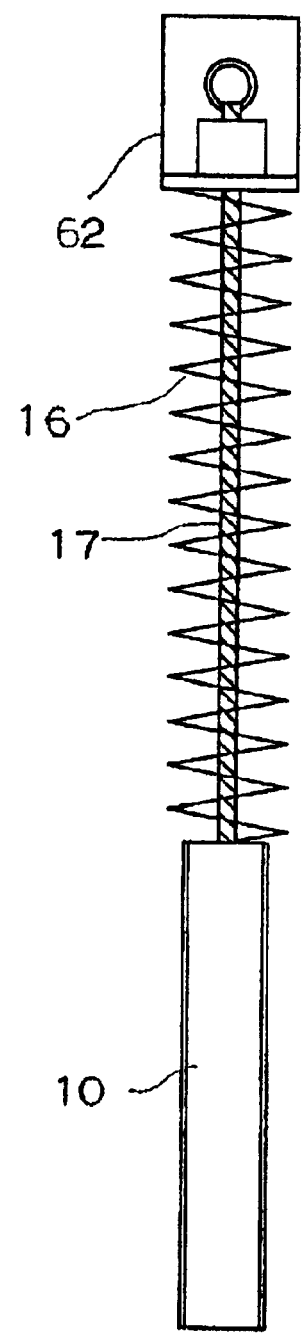

FIG. 10A
FIG. 10D
FIG. 10B
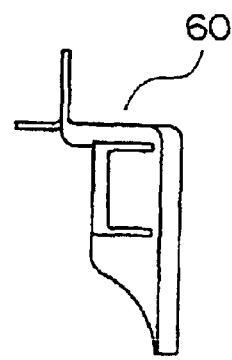 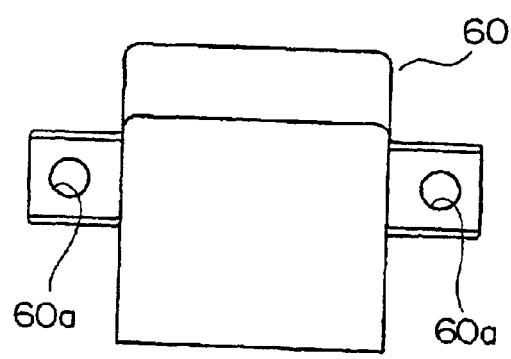
FIG. 10C

ALTERNATOR INCLUDING CASE WITH OPEN PORTION FOR BRUSH REMOVAL

BACKGROUND OF THE INVENTION

1. Field of the Invention

The present invention relates to an alternator used in an automotive alternator driven by an internal combustion engine, for example.

2. Description of the Related Art

FIG. 18 is a cross section of a conventional automotive alternator, FIG. 19 is a front elevation of an internal portion of the alternator of FIG. 18, FIG. 20 is a perspective of a rotor of the alternator in FIG. 18, and FIG. 21 is a perspective of a stator of the alternator in FIG. 18.

This alternator includes: a case 3 composed of an aluminum front bracket 1 and an aluminum rear bracket 2; a shaft 6 disposed inside the case 3, a pulley 4 being secured to a first end of the shaft 6; a Lundell-type rotor 7 secured to the shaft 6; first and second fans 5a and 5b secured to first and second end surfaces of the rotor 7; a stator 8 secured to an inner wall within the case 3; slip rings 9 secured to a second end of the shaft 6 for supplying electric current to the rotor 7; a pair of brushes 10 which slide on surfaces of the slip rings 9; wires 17 each having an end portion connected to these brushes 10; springs 16 for pressing the brushes 10 toward the slip rings 9; a brush holding assembly 100 having a holding portion 11a for housing the brushes 10 and a cover 11b removably disposed on a head portion of the holding portion 11a; a rectifier 12 which is electrically connected to the stator 8 for converting alternating current generated in the stator 8 into direct current; a regulator 13 secured to the brush holding assembly 100 for adjusting the magnitude of an alternating voltage generated in the stator 8; and a cooling plate 14 placed in contact with and secured to the regulator 13 to dissipate and cool heat generated in the regulator 13.

The rotor 7 includes: a rotor coil 18 for generating magnetic flux on passage of electric current; and a pole core 19 disposed so as to cover the rotor coil 18, magnetic poles being formed in the pole core 19 by the magnetic flux. The pole core 19 is constituted by a first pole core portion 20 and a second pole core portion 21 which intermesh with each other. The first pole core portion 20 is made of iron and has tapered first claw-shaped magnetic poles 22 extending axially. The second pole core portion 21 is made of iron and has tapered second claw-shaped magnetic poles 23 extending axially in an opposite direction to the first claw-shaped magnetic poles 22.

The stator 8 is constituted by: a stator core 24 for passage of a rotating magnetic field from the rotor coil 18, the stator core being formed by laminating a plurality of steel plates together; and three stator winding phase portions 25 through each of which an output current flows. The stator core 24 is constituted by an annular core back 26, and a plurality of teeth 27 extending radially inwards from the core back 26 at an even pitch in a circumferential direction. The stator winding phase portions 25, formed by winding an enamel-coated conducting wire for a plurality of winds, are housed in a total of thirty-six slots 28 formed between adjacent pairs of the teeth 27.

In an automotive alternator of the above construction, electric current is supplied from a battery (not shown), which is an electric power supply, through the brushes 10 and the slip rings 9 to the rotor coil 18, generating magnetic flux and giving rise to a magnetic field. At the same time, since the pulley 4 is driven by the engine and the rotor 7 is rotated by the shaft 6, a rotating magnetic field is applied to the stator core 24, generating electromotive force in the stator winding phase portions 25 and an output current is generated by an external load connected to the automotive alternator.

Moreover, after the commencement of power generation, the alternator is switched over to self-excitation, in which a portion of the electric current output from the alternator, rather than from the battery, is supplied through the brushes 10 to the rotor coil 18.

In an automotive alternator of the above construction, one problem has been that the brush holding assembly 100 is housed in a sealed case 3, and when replacing expended brushes 10, for example, the automotive alternator must first be disassembled and the brush holding assembly 100 removed from the case 3, then the operation of replacing the brushes 10 performed, and after that, the brush holding assembly 100 must be installed in the case 3 and the automotive alternator reassembled.

Another problem has been that, although an airflow is generated centrifugally inside the case 3 together with the rotation of the rotor 8, flow resistance is great and air does not flow smoothly, making cooling efficiency of the regulator 13 and the brushes 10 poor.

SUMMARY OF THE INVENTION

The present invention aims to solve the above problems and an object of the present invention is to provide an alternator enabling the operation of replacing the brushes to be performed easily, and having improved cooling efficiency.

In order to achieve the above object, according to one aspect of the present invention, there is provided an alternator including:

a case;

a rotor disposed inside the case, the rotor including a rotor coil for generating a magnetic flux on passage of an electric current therethrough, and a plurality of claw-shaped magnetic poles extending in an axial direction and covering the rotor coil, the claw-shaped magnetic poles being magnetized into North-seeking (N) and South-seeking (S) poles by the magnetic flux;

a stator including a stator core provided with a plurality of slots formed so as to extend axially and be spaced circumferentially, and a stator winding mounted to the stator core;

brushes for supplying electric current from an electric power supply to the rotor coil; and a brush holding assembly secured to the case, the brush holding assembly holding the brushes within a holding portion and being provided with a cover capable of being opened to remove the brushes, an open portion for removal and insertion of the brushes being formed at a position on the case facing the cover.

The brush holding assembly may extend to a vicinity of the open portion.

The brush holding assembly may be constructed such that a holding assembly terminal is formed integrally therewith in a resin molding, the holding assembly terminal and a brush terminal mounted to a wire connected to the brushes being electrically connected by a connection member.

A connection portion for connecting the holding assembly terminal and the brush terminal may be disposed in the open portion.

The connection member may be a screw.

The screw may be inserted into and removed from the connection portion in a circumferential direction relative to the rotor.

The screw may be inserted into and removed from the connection portion in an axial direction relative to the rotor.

A regulator for adjusting a magnitude of an alternating voltage generated in the stator and a cooling plate placed in contact with the regulator may be disposed on the brush holding assembly so as to overlap in an axial direction relative to the rotor.

A conducting wire of the stator winding may extend outwards in an axial direction from an end surface of the stator core and be formed into coil ends having a uniform shape in a circumferential direction.

BRIEF DESCRIPTION OF THE DRAWINGS

FIG. 8A is a front elevation of a brush and a brush terminal from the automotive alternator in FIG. 4;

FIG. 8B is a side elevation of the brush and the brush terminal from the automotive alternator in FIG. 4 viewed from the right-hand side in FIG. 8A;

FIG. 10A is a view of the cap from FIG. 4 from the direction of an arrow C in FIG. 9;

FIG. 10B is a view of the cap from FIG. 4 from the direction of an arrow D in FIG. 9;

FIG. 10C is a view of the cap from FIG. 4 from the direction of an arrow E in FIG. 9;

FIG. 10D is a view of the cap from FIG. 4 from the direction of an arrow F in FIG. 9;

DETAILED DESCRIPTION OF THE PREFERRED EMBODIMENTS

The preferred embodiments of the present invention will now be explained, and members or portions the same as or corresponding to those in the conventional example will be given the same numbering.

Embodiment 1

Figure 1:
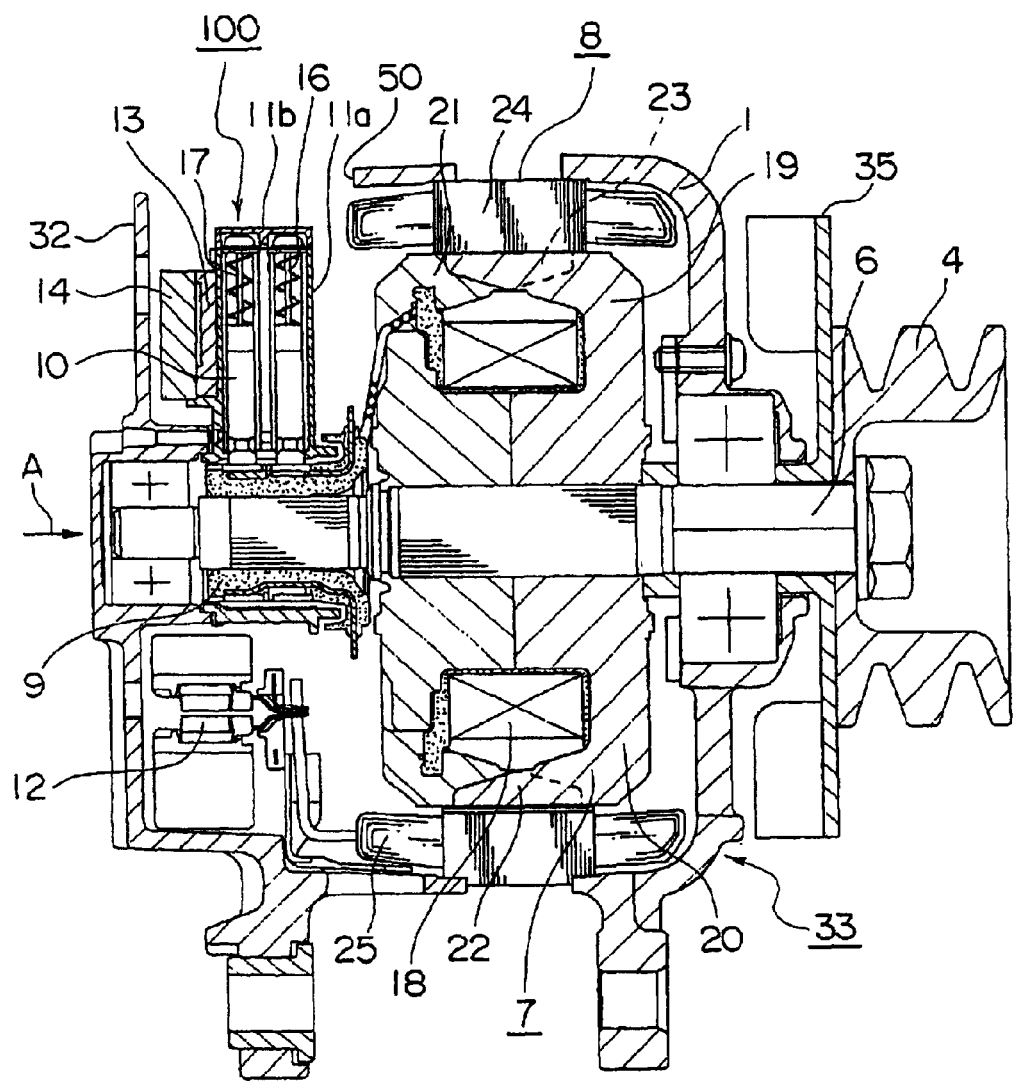
FIG. 1 is a cross section of an automotive alternator according to Embodiment 1 of the present invention.
Figure 2:
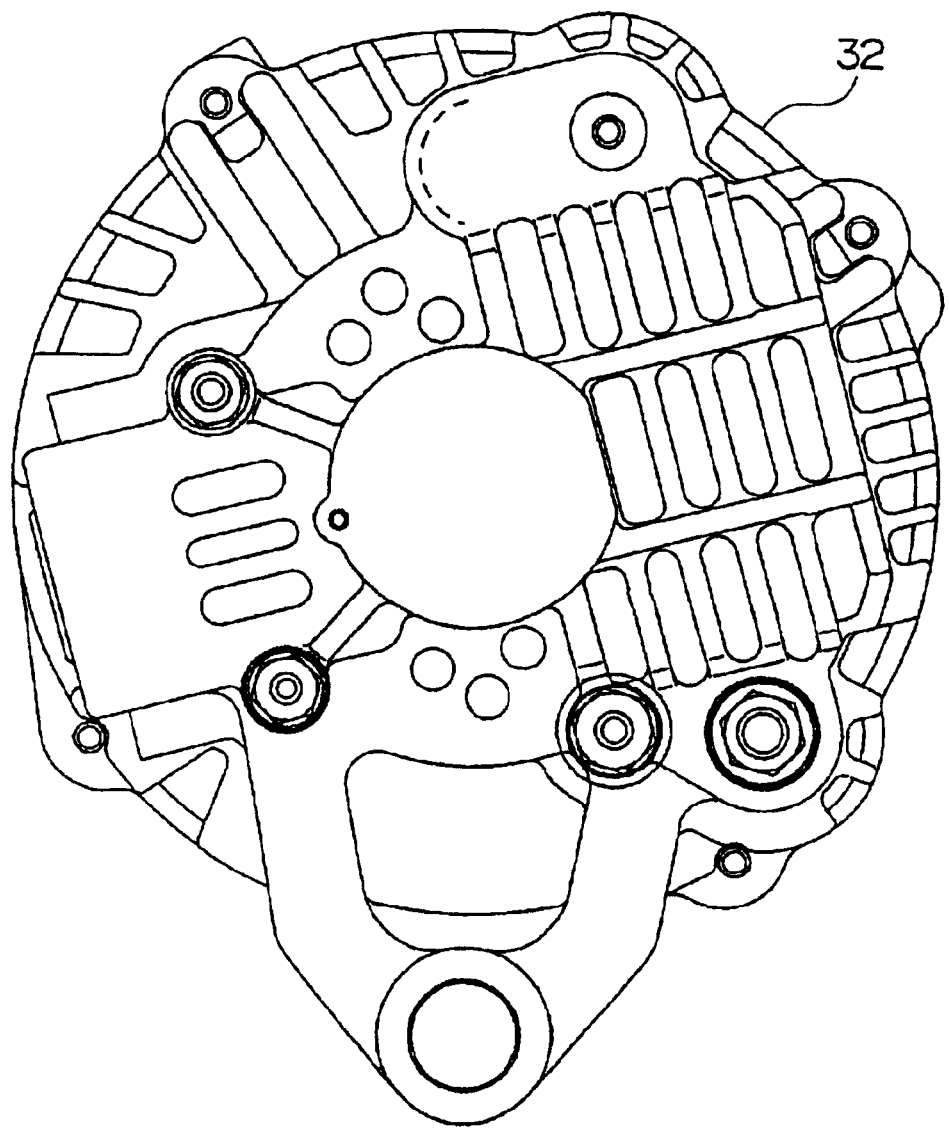
FIG. 2 is a view of the automotive alternator in FIG. 1 from the direction of an arrow A.

FIG. 1 is a cross section of an automotive alternator according to Embodiment 1 of the present invention, and FIG. 2 is a view of the automotive alternator in FIG. 1 from the direction of an arrow A.

This alternator includes: a case 33 composed of an aluminum front bracket 1 and an aluminum rear bracket 32; a shaft 6 disposed inside the case 33, a pulley 4 being secured to a first end of the shaft 6; a Lundell-type rotor 7 secured to the shaft 6; a fan 35 secured to the shaft 6 outside the case 33; a stator 8 secured to an inner wall within the case 33; slip rings 9 secured to a second end of the shaft 6 for supplying electric current to the rotor 7; a pair of brushes 10 which slide on surfaces of the slip rings 9; wires 17 each having an end portion connected to these brushes 10; springs 16 for pressing the brushes 10 toward the slip rings 9; a brush holding assembly 100 having a holding portion 11a for housing the brushes 10 and a cover 11b removably disposed on a head portion of the holding portion 11a; a rectifier 12 which is electrically connected to the stator 8 for converting alternating current generated in the stator 8 into direct current; a regulator 13 secured to the brush holding assembly 100 for adjusting the magnitude of an alternating voltage generated in the stator 8; a cooling plate 14 placed in contact with and secured to the regulator 13, the cooling plate 14 having cooling fins extending in a radial direction of the rotor 7 for dissipating and cooling heat generated in the regulator 13; and a surge absorber 15 for absorbing surges generated by voltage regulation by the regulator 13.

The brush holding assembly 100 is constructed such that terminals electrically connected to a battery, which is a power supply, are formed integrally therewith in a resin molding. An open portion 50 is formed in a position on the case 33 facing the cover 11b of the brush holding assembly 100.

Figure 3:
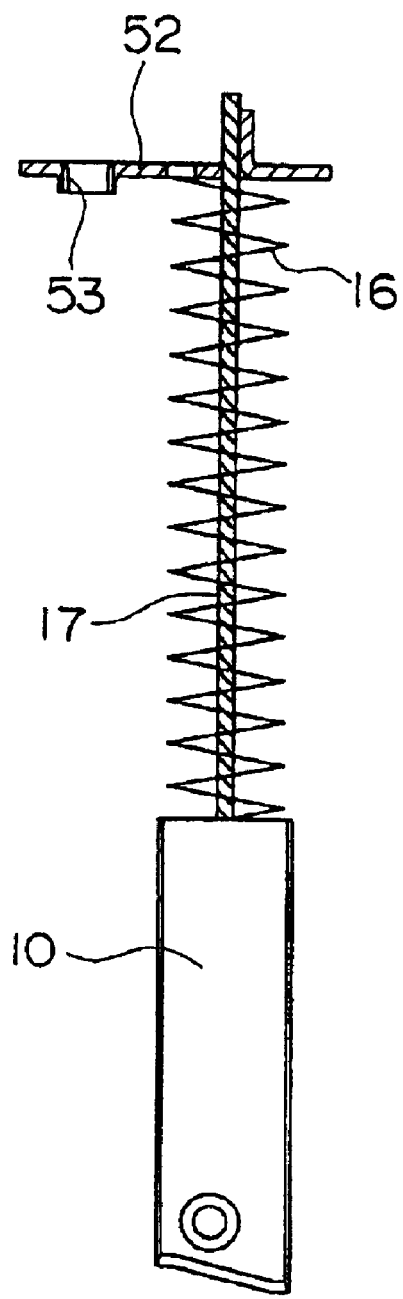
FIG. 3 is a diagram showing a brush and a brush terminal from FIG. 1.

As shown in FIG. 3, brush terminals 52 secured to terminals of the brush holding assembly 100 by screws which are connection members passing through screw apertures 53 are mounted to the wires 17 extending from the brushes 10.

The rotor 7 includes: a rotor coil 18 for generating magnetic flux on passage of an electric current therethrough; and a pole core 19 disposed so as to cover the rotor coil 18, magnetic poles being formed in the pole core 19 by the magnetic flux. The pole core 19 is constituted by a first pole core portion 20 and a second pole core portion 21 which intermesh with each other. The first pole core portion 20 is made of iron and has tapered first claw-shaped magnetic poles 22 extending axially. The second pole core portion 21 is made of iron and has tapered second claw-shaped magnetic poles 23 extending axially in an opposite direction to the first claw-shaped magnetic poles 22.

The stator 8 is constituted by: a stator core 24 for passage of a rotating magnetic field from the rotor coil 18, the stator core 24 being formed by laminating a plurality of steel plates; and three stator winding phase portions 25 through each of which an output current flows. The stator core 24 is constituted by an annular core back 26, and a plurality of teeth 27 extending radially inwards from the core back 26 at an even pitch in a circumferential direction. The stator winding phase portions 25, formed by winding an enamel-coated conducting wire for a plurality of winds, are housed in a total of thirty-six slots 28 formed between adjacent pairs of the teeth 27.

In an automotive alternator of the above construction, electric current is supplied from the battery through the brushes 10 and the slip rings 9 to the rotor coil 18, generating magnetic flux and giving rise to a magnetic field. At the same time, since the pulley 4 is driven by an engine and the rotor 7 is rotated by the shaft 6, a rotating magnetic field is applied to the stator core 24, generating electromotive force in the stator winding phase portions 25 and an output current is generated by an external load connected to the automotive alternator.

In the automotive alternator of the above construction, because the open portion 50 is formed in the position on the case 33 facing the cover 11b of the brush holding assembly 100, replacement of the brushes 10 may be performed simply by removing the cover 11b and the screws secured in the screw apertures 53 from the brush holding assembly 100, and there is no necessity to go to the trouble of disassembling the alternator. Moreover, the operation of removing and replacing the screws in the screw apertures 53 is performed in a radial direction.

Because a connection portion connecting the holding assembly terminals of the brush holding assembly 100 and the brush terminals 52 is disposed in the open portion 50, connection of the holding assembly terminals and the brush terminals 52 can be performed easily.

The fan 35 is disposed outside the case 33 and a radial convection current generated by the rotation of the rotor 7 flows through the open portion 50 to the outside in the vicinity of the brush holding assembly 100, efficiently cooling the regulator 13 secured to the brush holding assembly 100 and the brushes 10 inside the holding portion 11a of the brush holding assembly 100.

Because the regulator 13 and the cooling plate 14 which is in contact with the regulator 13 are disposed on the brush holding assembly 100 so as to overlap the rotor 7 in an axial direction, the construction is compact, and because a centrifugal flow is efficiently generated by axially overlapping the brushes 10 and the cooling plate 14, which has cooling fins extending in a radial direction of the rotor 7, cooling of the regulator 13 is improved. Furthermore, because the brush holding assembly 100 is secured to the rear bracket 2 after the regulator 13 has been secured to the brush holding assembly 100, the brush holding assembly 100 is not obstructed by the regulator 13 when mounting the brush holding assembly 100 to the rear bracket 2.

Embodiment 2

Figure 4:
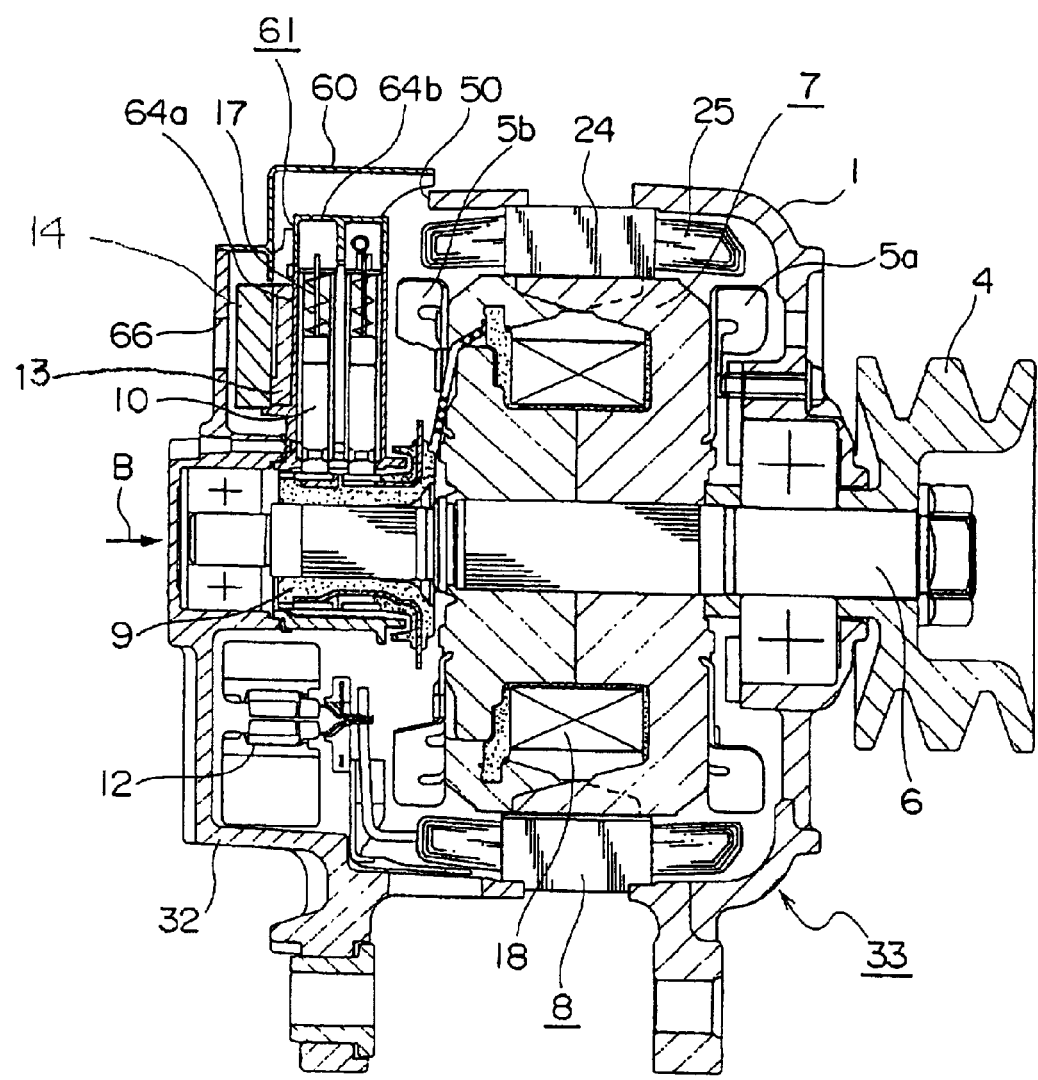
FIG. 4 is a cross section of an automotive alternator according to Embodiment 2 of the present invention.
Figure 5:
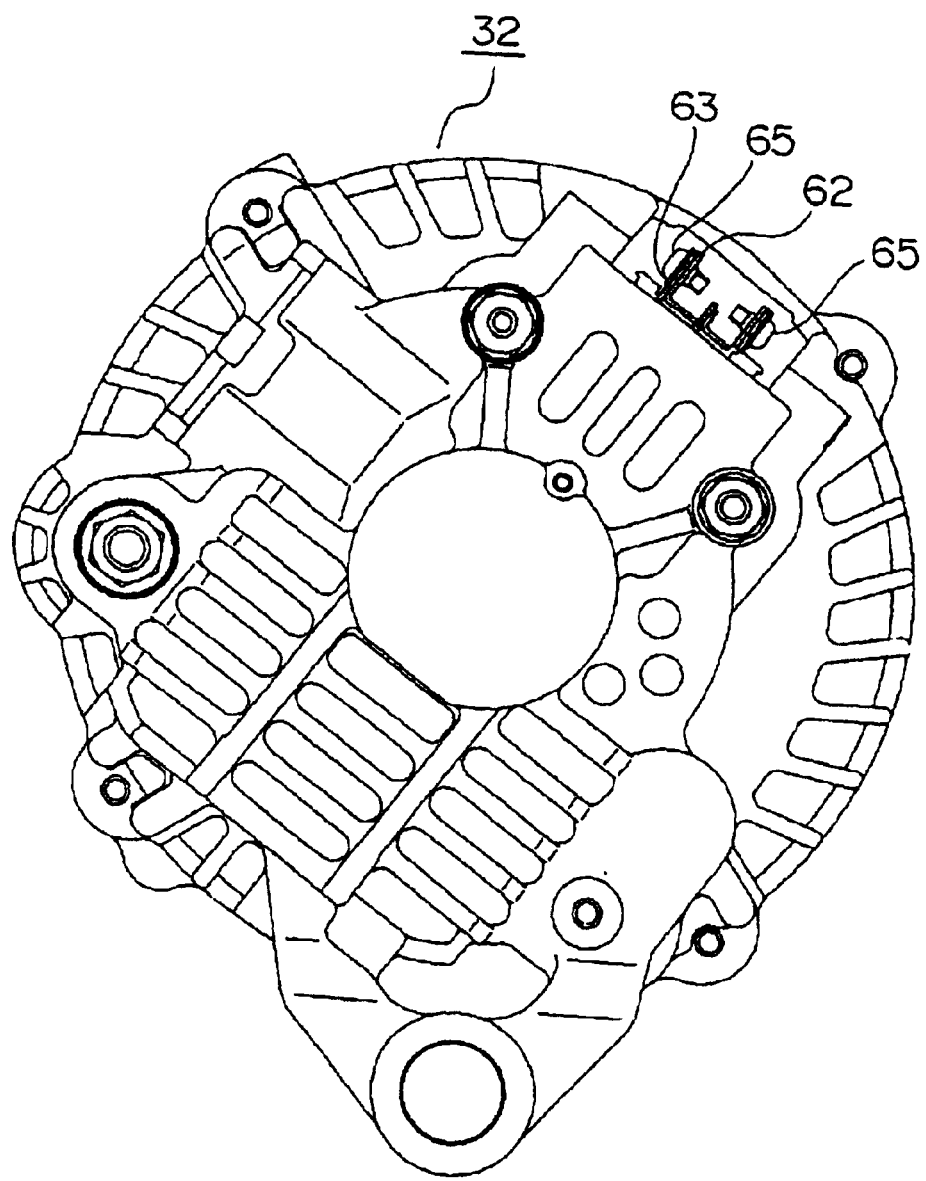
FIG. 5 is a view of the automotive alternator in FIG. 4 viewed from the direction of an arrow B.
Figure 6:
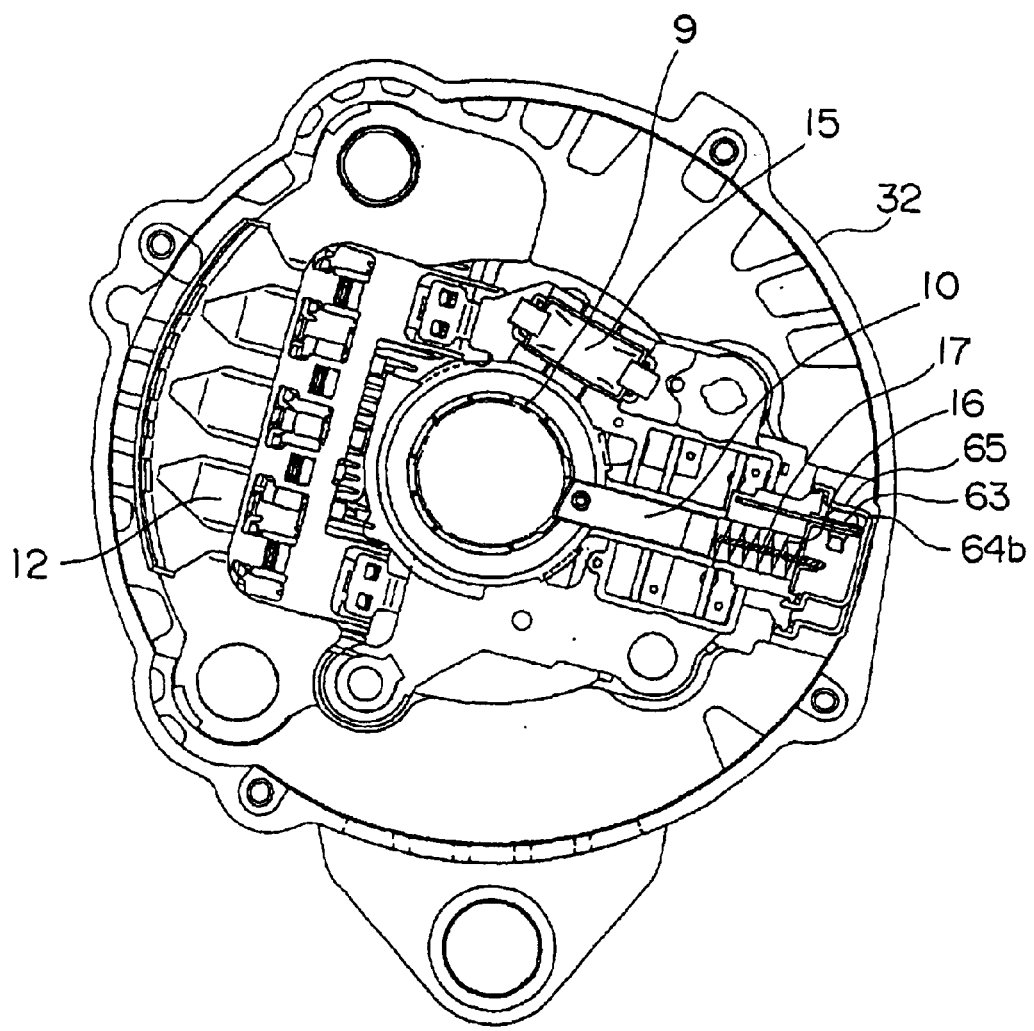
FIG. 6 is a view of a rear bracket end of the automotive alternator in FIG. 4 from inside a case.
Figure 7A:
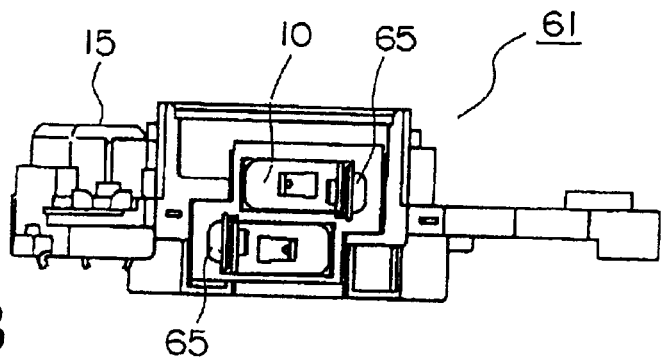
FIG. 7A is a plan of a brush holding assembly of the automotive alternator in FIG. 4 with a cover removed.
Figure 7B:
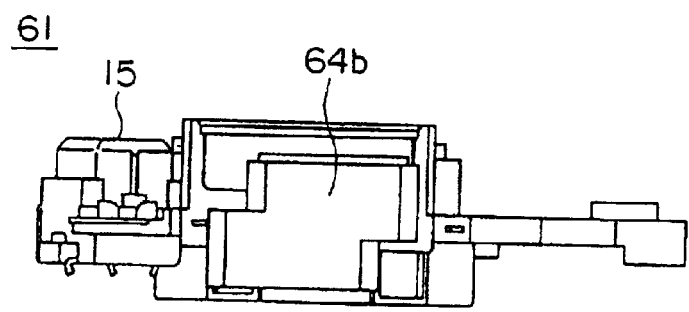
FIG. 7B is a plan of the brush holding assembly of the automotive alternator in FIG. 4.
Figure 7C:
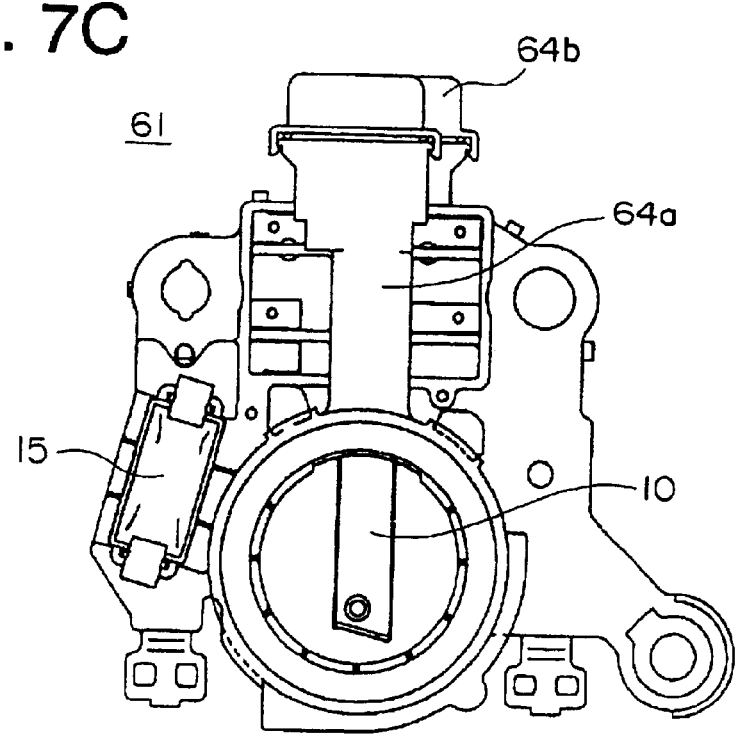
FIG. 7C is a front elevation of the brush holding assembly of the automotive alternator in FIG. 4.

FIG. 4 is a cross section of an automotive alternator according to Embodiment 2 of the present invention, FIG. 5 is a view of the automotive alternator in FIG. 4 viewed from the direction of an arrow B (a cap 60 is omitted), FIG. 6 is a diagram showing a rear bracket end of an internal portion of the automotive alternator in FIG. 4, FIG. 7A is a plan of a brush holding assembly 61 of the automotive alternator in FIG. 4 with a cover 64b removed, FIG. 7B is a plan of the brush holding assembly 61 of the automotive alternator in FIG. 4, FIG. 7C is a front elevation of the brush holding assembly 61 of the automotive alternator in FIG. 4, FIG. 8A is a front elevation of a brush 10 and a brush terminal 62 from the automotive alternator in FIG. 4, and FIG. 8B is a side elevation of the brush 10 and the brush terminal 62 from the automotive alternator in FIG. 4 viewed from the right-hand side in FIG. 8A.

Figure 9:
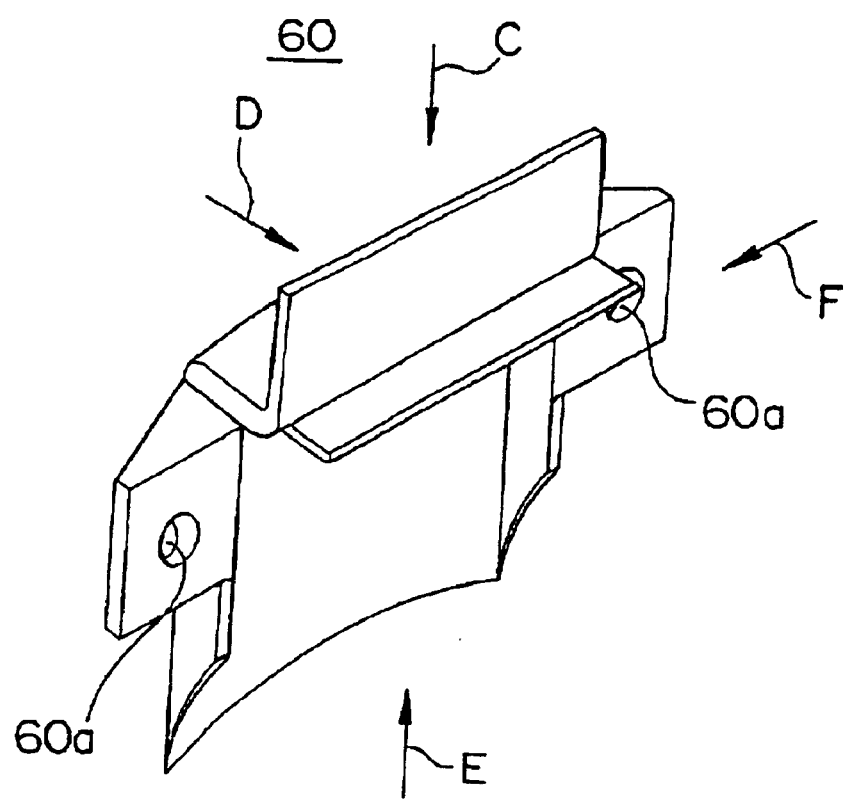
FIG. 9 is a perspective of a cap from FIG. 4.

In Embodiment 2, the cap 60, shown in FIGS. 9 and 10, is mounted over the open portion 50 formed in the rear bracket 32. Holding assembly terminals 63 of the brush holding assembly 61 are exposed at the open portion 50, and the brush terminals 62 are secured to the holding assembly terminals 63 by a pair of screws 65. Tip portions of the pair of screws 65 are oriented in a circumferential direction. A radial dimension of a holding portion 64a of the brush holding assembly 61 extends to a vicinity of the open portion 50 of the rear bracket 32, as can be seen from FIG. 4. Furthermore, first and second fans 5a and 5b are secured to first and second end surfaces of the rotor 7.

Except for the above construction, the automotive alternator according to Embodiment 2 has a similar construction to that of the automotive alternator according to Embodiment 1.

In the automotive alternator of the above construction, because the cap 60 is secured over the open portion 50 by screwing at the screw apertures 60a, foreign matter, water, etc. are prevented from entering the case 33.

Because the brush terminals 62 are secured by the screws 65 to the holding assembly terminals 63 of the brush holding assembly 61 which are exposed at the open portion 50, electrical connection of the holding assembly terminals 63 and the brushes 10 is simple, and the operation of replacing the brushes 10 is improved. Furthermore, because the tip portions of the pair of screws 65 are oriented in the circumferential direction, a removal tool can be used from the circumferential direction and the extent of movement of the tool will not greatly exceed the axial bounds of the case 33, making the construction ideal for the operation of replacing the brushes 10 in an internal combustion engine in which parts are densely clustered in an axial direction relative to the shaft 6.

Because the radial dimension of the brush holding assembly 61 extends to the vicinity of the open portion 50 of the rear bracket 32, a longitudinal dimension of the brushes 10 can be lengthened proportionately, enabling the brushes 10 to be used over a long period without replacement. Furthermore, because clearance between the rear bracket 32 and the brush holding assembly 61 is small, a large proportion of air which has entered the case 33 through a ventilation aperture 66 takes a circuitous route and flows toward the regulator 13 and the brushes 10, improving cooling of the regulator 13 and the brushes 10.

Unlike Embodiment 1, because the centrifugal second fan 5b is disposed on the second end surface of the rotor 7, which is near the brush holding assembly 61, a large proportion of centrifugal flow is generated in the vicinity of the brush holding assembly 61. Hence, the centrifugal flow circulates more efficiently because the cooling plate 14, which has cooling fins extending in a radial direction relative to the rotor 7, and the brushes 10 overlap in an axial direction, and also because the brushes 10 extend to the vicinity of the open portion 50 of the rear bracket 32, improving cooling.

Embodiment 3

Figure 11:
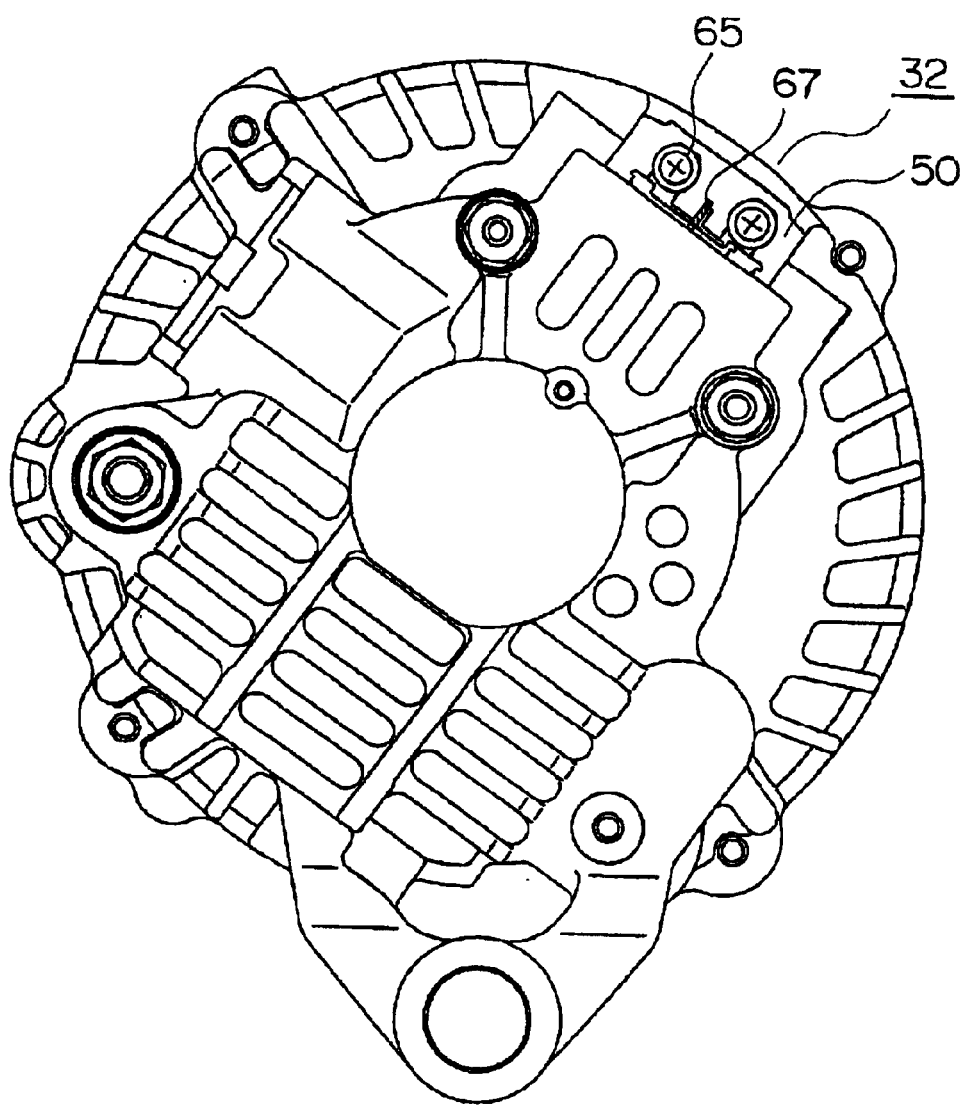
FIG. 11 is a view of an automotive alternator according to Embodiment 3 of the present invention from a rear bracket end (with a cap removed)
Figure 12A:
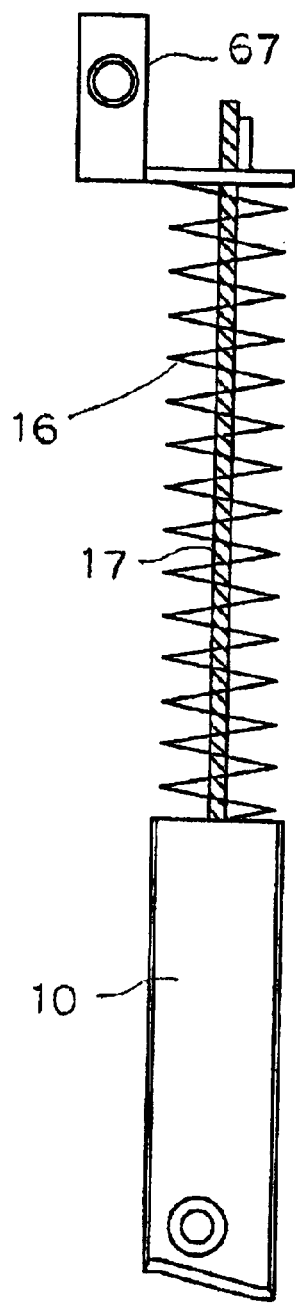
FIG. 12A is a front elevation of a brush and a brush terminal from the automotive alternator in FIG. 11.
Figure 12B:
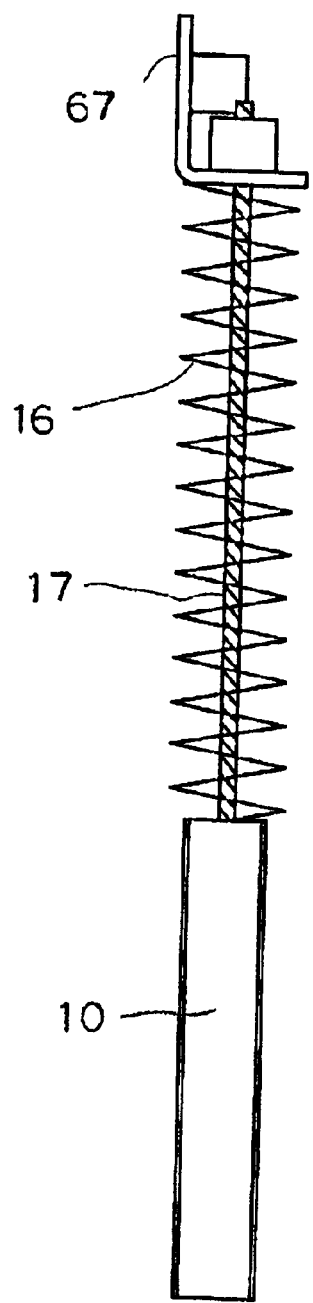
FIG. 12B is a side elevation of the brush and the brush terminal from the automotive alternator in FIG. 11 viewed from the right-hand side in FIG. 12A.

FIG. 11 is a view of an automotive alternator according to Embodiment 3 of the present invention from an end of a rear bracket 32 (with the cap 60 removed), FIG. 12A is a front elevation of a brush 10 and a brush terminal 67 from the automotive alternator in FIG. 11, and FIG. 12B is a side elevation of the brush 10 and the brush terminal 67 from the automotive alternator in FIG. 11 viewed from the right-hand side in FIG. 12A.

In Embodiment 3, the holding assembly terminals 63 of the brush holding assembly 61 are exposed at the open portion 50, and brush terminals 67 are secured to the holding assembly terminals 63 by the pair of screws 65. The tip portions of the pair of screws 65 are oriented in an axial direction.

Except for the above construction, the automotive alternator according to Embodiment 3 has a similar construction to that of the automotive alternator according to Embodiment 2.

In the automotive alternator of the above construction, the brush terminals 67 are secured by the pair of screws 65 to the holding assembly terminals 63 of the brush holding assembly 61, and because the tip portions of the pair of screws 65 are oriented in the axial direction, a removal tool can be used from the axial direction and the extent of movement of the tool will be within the bounds of a radial dimension of the case 33, making the construction ideal for the operation of replacing the brushes 10 in an internal combustion engine in which parts are densely clustered in a radial direction relative to the shaft 6.

Embodiment 4

Figure 13:
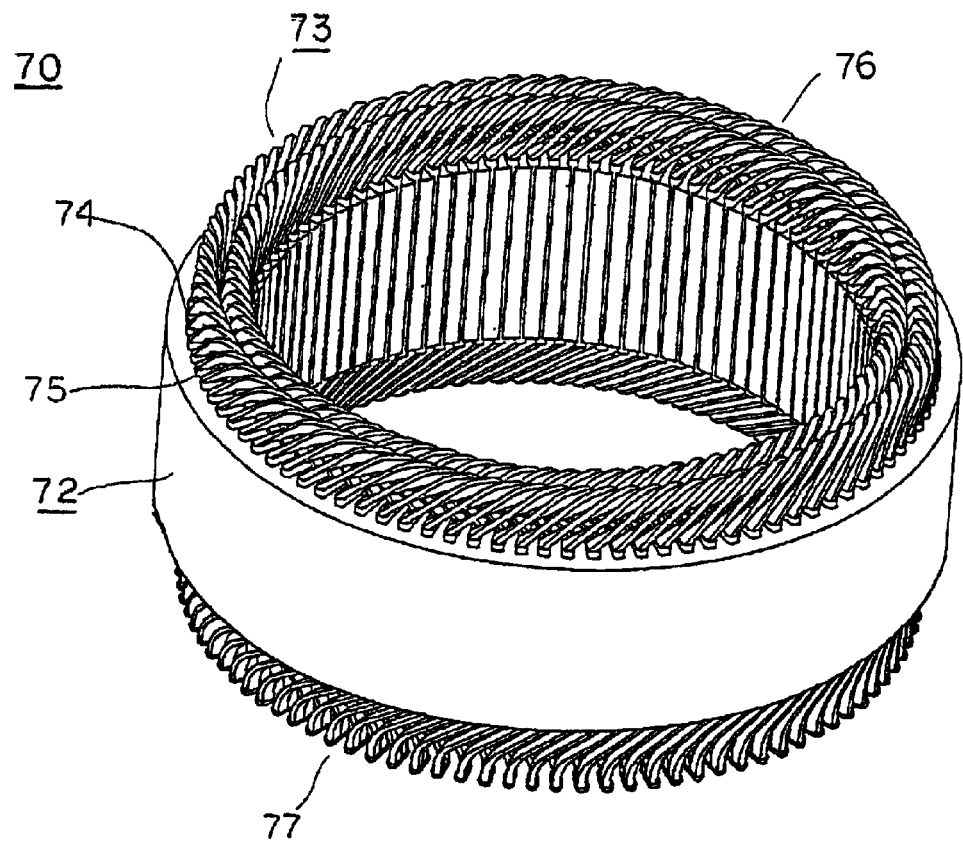
FIG. 13 is a perspective of a stator of an automotive alternator according to Embodiment 4 of the present invention.
Figure 14:
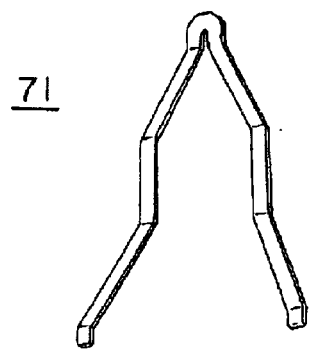
FIG. 14 is a perspective showing a conductor segment used in a stator winding of the stator in FIG. 13.
Figure 15:
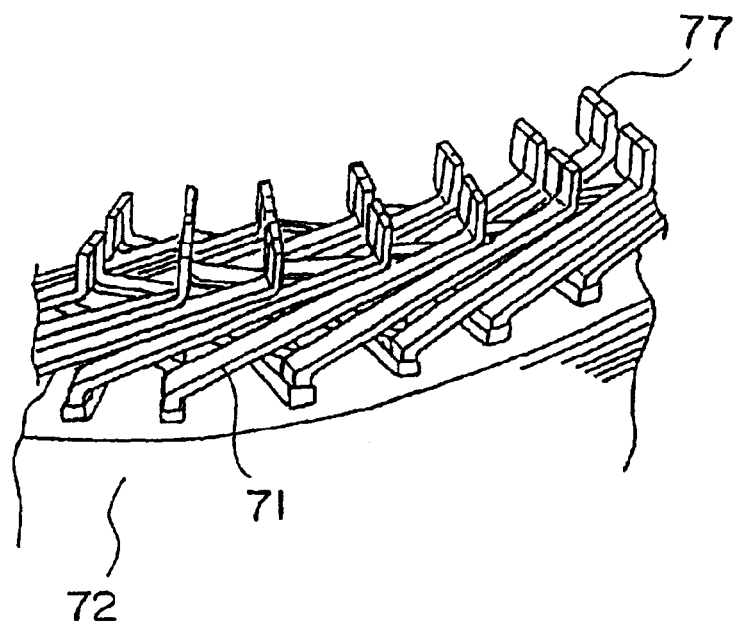
FIG. 15 is a perspective of part of the stator in FIG. 13 viewed from a front end.
Figure 16:
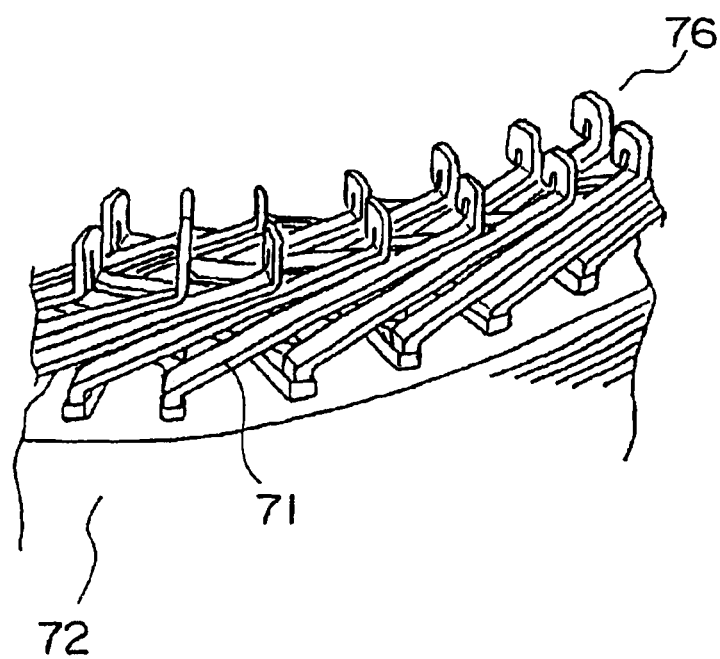
FIG. 16 is a perspective of part of the stator in FIG. 13 viewed from a rear end.

FIG. 13 is a perspective of a stator 70 of an automotive alternator according to Embodiment 4 of the present invention, FIG. 14 is a perspective showing a conductor segment 71 used in a stator winding 73 of the stator 70 in FIG. 13, and FIGS. 15 and 16 are perspectives of part of the stator 70 in FIG. 13 viewed from a front end and a rear end, respectively.

In Embodiment 4, the stator 70 includes: a stator core 72; the stator winding 73 wound on the stator core 72; and an electrically-insulating member 75 for electrically insulating the stator winding 73 from the stator core 72, the electrically-insulating member 75 being mounted in a plurality of slots 74 disposed in the stator core 72. The stator core 72 is a cylindrical laminated core laminated by building up a thin steel plate which is a plate-shaped magnetic member, and the plurality of slots 74 extend axially and are disposed at a predetermined pitch in a circumferential direction so as to open towards an inner circumferential side of the stator core 72. The stator winding 73 is constructed by joining a large number of short conductor segments 71 in a predetermined winding pattern. More specifically, the stator winding 73 is constructed by forming the short conductor segments 71 into a general U shape, inserting end portions thereof into the slots 74 of the stator core 72 from a rear end, and joining together the end portions which extend outwards at a front end.

Except for the construction of the above stator 70, the automotive alternator according to Embodiment 4 has a similar construction to that of the automotive alternator according to Embodiment 3.

In Embodiment 4, the plurality of conductor segments 71, which are conducting wires, are arranged neatly around the stator core 72, and air gaps are formed between adjacent pairs of the conductor segments 71 in rear-end coil ends 76 and front-end coil ends 77 of the stator winding 73. For that reason, when air which has entered the case 33 through the ventilation aperture 66 passes through the coil ends 76 and 77 and is expelled outside the case 33, ventilation resistance is small in the coil ends 76 and 77 on a discharge side and the air flows proportionately smoothly within the case 33, improving cooling of the brushes 10 and the regulator 13, which are on an intake side.

Figure 17:
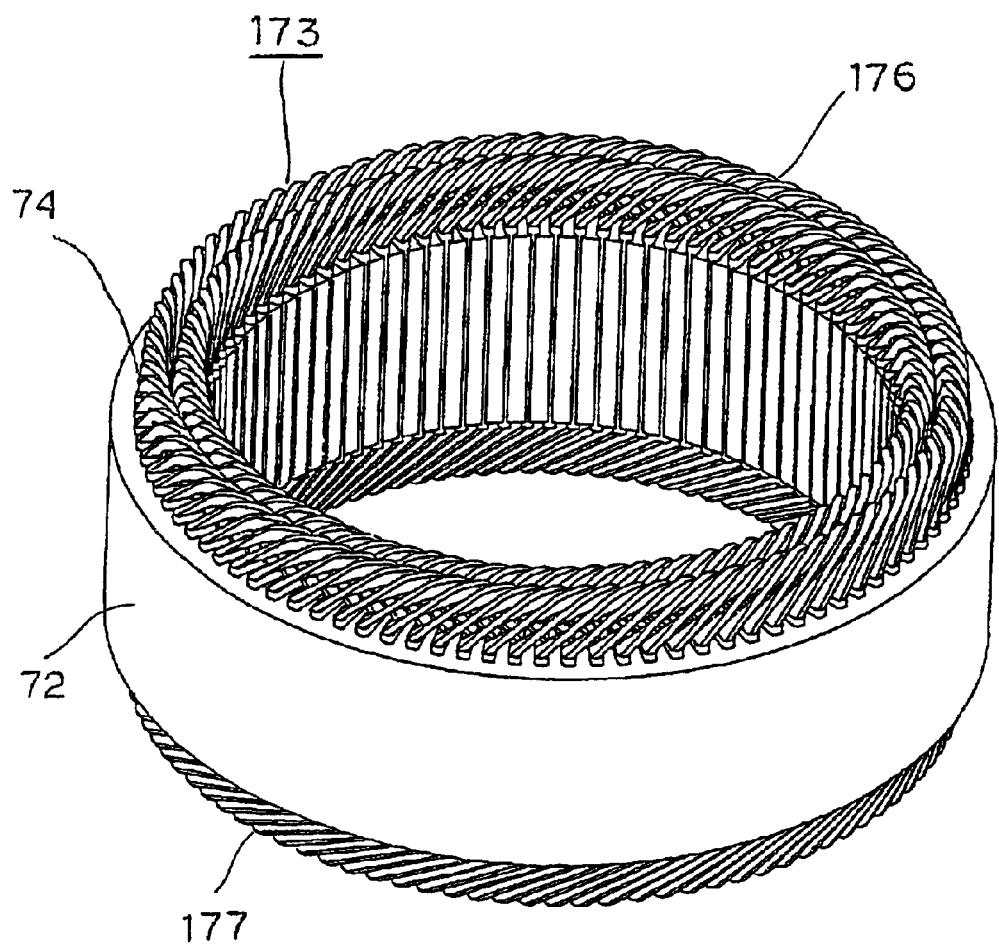
FIG. 17 is a perspective of a variation of the stator in FIG. 13.
Figure 18:
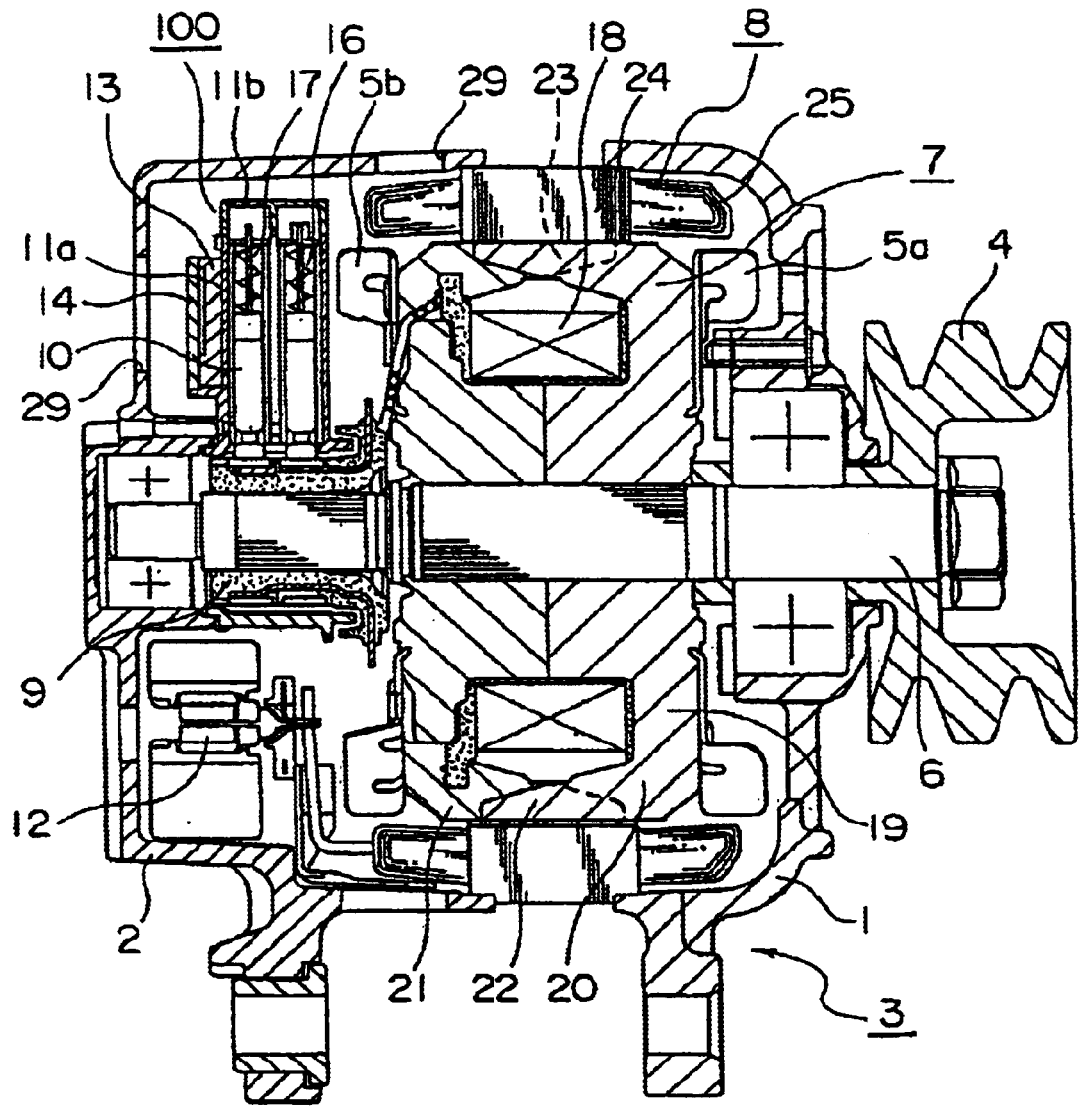
FIG. 18 is a cross section of a conventional automotive alternator.
Figure 19:
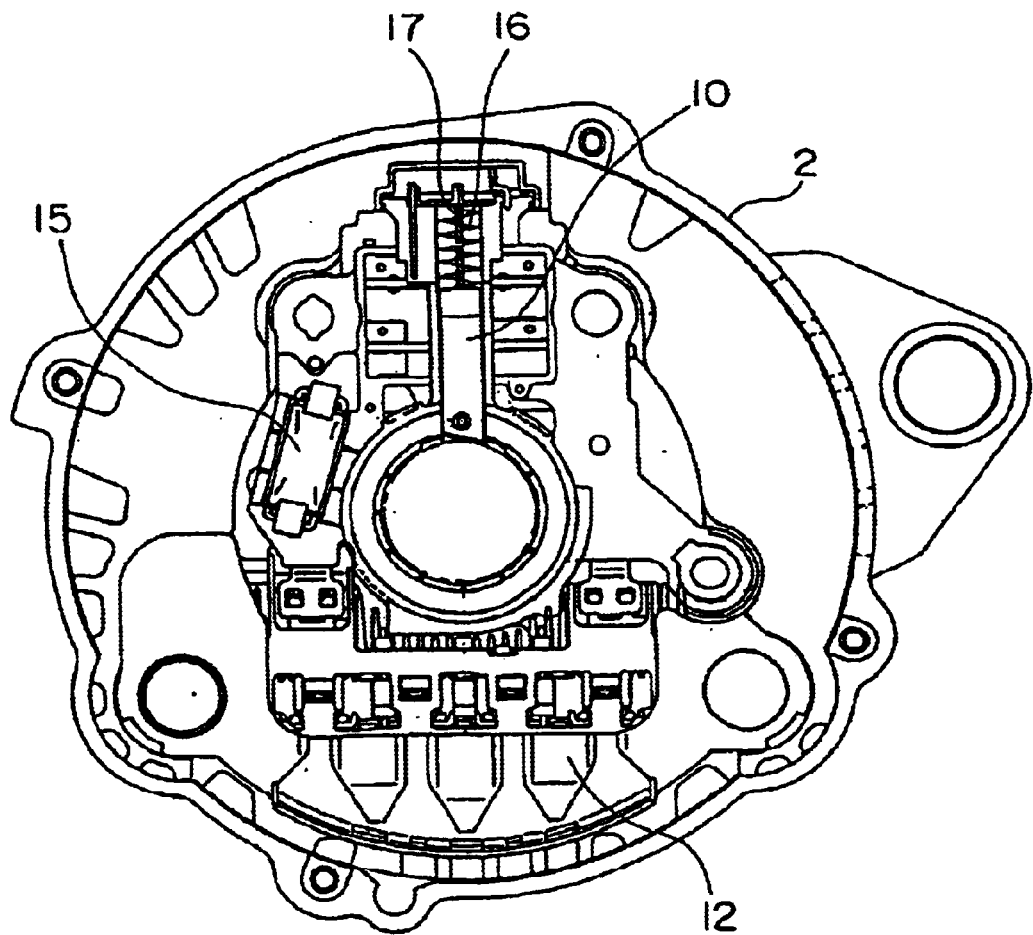
FIG. 19 is a view of the automotive alternator in FIG. 18 from a rear bracket end.
Figure 20:
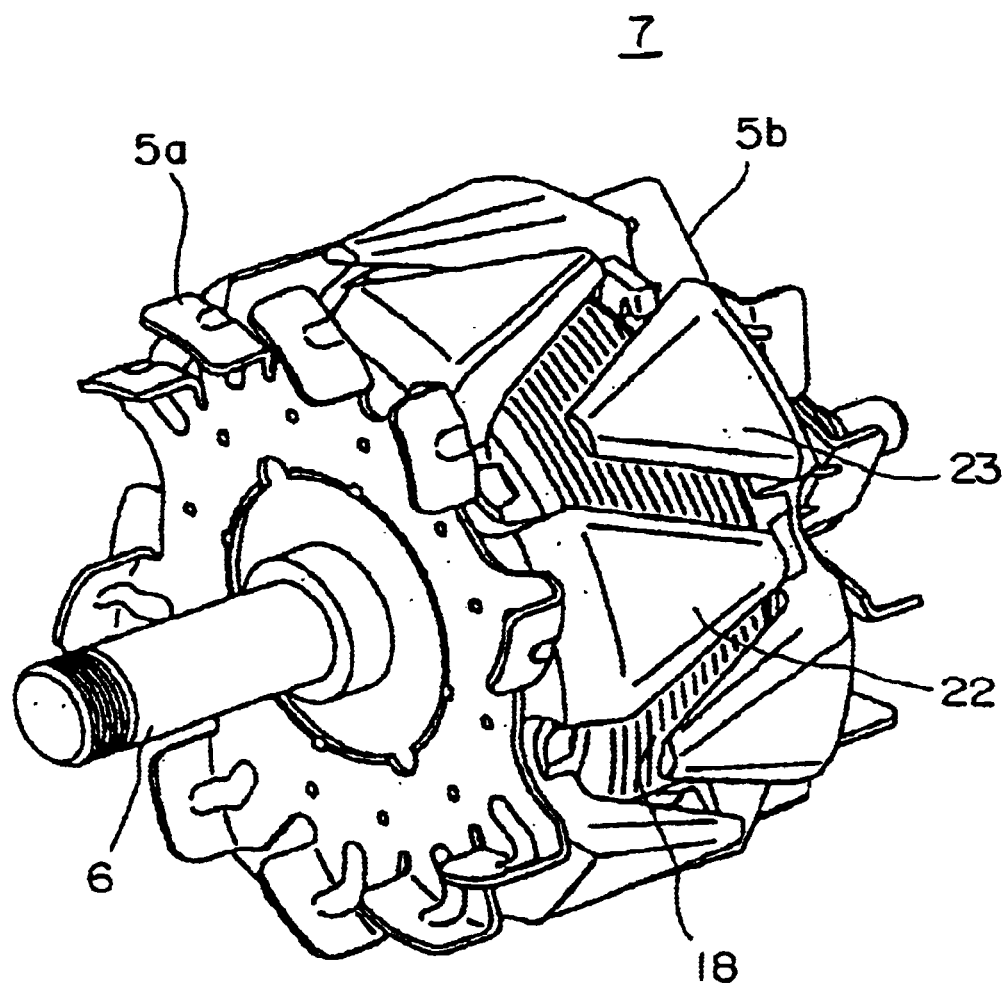
FIG. 20 is a perspective of a rotor from FIG. 18.
Figure 21:
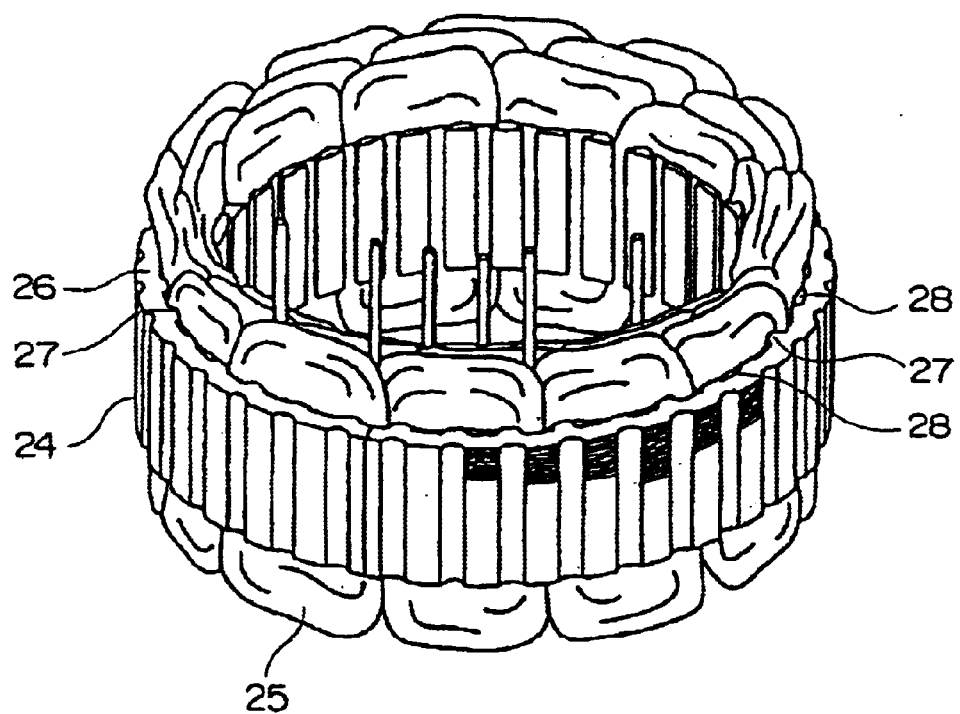
FIG. 21 is a perspective of a stator from FIG. 18.

Moreover, as shown in FIG. 17, the automotive alternator may also have a stator winding 173 which is wound by folding back continuous conducting wires outside the slots 74 at end surfaces of the stator core 72 so as to alternately occupy an inner layer and an outer layer in a slot depth direction within the slots 74 at intervals of a predetermined number of slots. In that case also, the continuous conducting wires extend outwards in an axial direction from the end surfaces of the stator core 72 and are formed into a uniform shape in a circumferential direction in rear-end and front-end coil ends 176 and 177 of the stator winding 173.

In this alternator, unlike the alternator which has joint portions joining together the end portions of the conductor segments 71 at the front end, there are no joint portions even in the front-end coil ends 177, thereby further reducing the ventilation resistance in the front-end coil ends 177 and further improving the cooling of the brushes 10 and the regulator 13, which are on the intake side.

Moreover, each of the above embodiments has been explained with reference to an automotive alternator in which two brushes 10 are housed in the brush holding assembly, but the present invention can also be applied to automotive alternators having four brushes, for example.

Furthermore, in each of the above embodiments, screws are used as connection members, but the connection members may also be rivets, or fastening members composed of nuts and bolts, for example.

As explained above, according to one aspect of the present invention, there is provided an alternator including:

a case;

a rotor disposed inside the case, the rotor including a rotor coil for generating a magnetic flux on passage of an electric current therethrough, and a plurality of claw-shaped magnetic poles extending in an axial direction and covering the rotor coil, the claw-shaped magnetic poles being magnetized into North-seeking (N) and South-seeking (S) poles by the magnetic flux;

a stator including a stator core provided with a plurality of slots formed so as to extend axially and be spaced circumferentially, and a stator winding mounted to the stator core;

brushes for supplying electric current from an electric power supply to the rotor coil; and a brush holding assembly secured to the case, the brush holding assembly holding the brushes within a holding portion and being provided with a cover capable of being opened to remove the brushes, an open portion for removal and insertion of the brushes being formed at a position on the case facing the cover, enabling brush replacement to be performed simply by passing the brushes through the open portion.

The open portion also acts as an air outlet for radial convection currents of air generated by the rotation of the rotor, proportionately decreasing the flow resistance of the air and improving cooling of the brush and the regulator secured to the brush holding assembly, for example.

The brush holding assembly may extend to a vicinity of the open portion, enabling a longitudinal dimension of the brush to be lengthened proportionately and also enabling the brushes to be used over a long period without replacement.

Furthermore, because clearance between the case and the brush holding assembly is small, air which has entered the case takes a circuitous route, for example flowing toward the brush and the regulator secured to the brush holding assembly, improving cooling of the regulator and the brushes.

The brush holding assembly may be constructed such that a holding assembly terminal is formed integrally therewith in a resin molding, the holding assembly terminal and a brush terminal mounted to a wire connected to the brushes being electrically connected by a connection member, enabling electrical connection of the holding assembly terminal and the brush terminal to be performed simply using the connection member.

A connection portion for connecting the holding assembly terminal and the brush terminal may be disposed in the open portion, whereby the open portion forms a space for the connection operation, enabling connection of the holding assembly terminal and the brush terminal to be performed simply.

The connection member may be a screw, enabling the holding assembly terminal and the brush terminal to be connected firmly and inexpensively.

The screw may be inserted into and removed from the connection portion in a circumferential direction relative to the rotor, enabling a tool for removal of the connection member to be used from the circumferential direction, thereby making the construction ideal for the operation of replacing the brushes in an internal combustion engine in which parts are densely clustered in an axial direction.

The screw may be inserted into and removed from the connection portion in an axial direction relative to the rotor, enabling a tool for removal of the connection member to be used from the axial direction, thereby making the construction ideal for the operation of replacing the brush in an internal combustion engine in which parts are densely clustered in a radial direction relative to the rotor.

A regulator for adjusting a magnitude of an alternating voltage generated in the stator and a cooling plate placed in contact with the regulator may be disposed on the brush holding assembly so as to overlap in an axial direction relative to the rotor, making the construction compact and improving cooling of the regulator. Furthermore, by securing the brush holding assembly to the case after the regulator has been secured to the brush holding assembly, the brush holding assembly can be mounted to the case without being obstructed by the regulator.

A conducting wire of the stator winding may extend outwards in an axial direction from an end surface of the stator core and be formed into coil ends having a uniform shape in a circumferential direction, whereby, when air which has entered the case passes through the coil ends and is expelled outside the case, ventilation resistance is small in the coil ends on a discharge side and the air flows proportionately smoothly within the case, improving cooling of the brushes and the regulator, which are on an intake side.

What is claimed is:

1. An alternator comprising:
   a case;
   a rotor disposed inside said case, said rotor including a rotor coil for generating a magnetic flux on passage of an electric current therethrough, and a plurality of claw-shaped magnetic poles extending in an axial direction and covering said rotor coil, said claw-shaped magnetic poles being magnetized into North-seeking (N) and South-seeking (S) poles by said magnetic flux;
   a stator including a stator core provided with a plurality of slots formed so as to extend axially and be spaced circumferentially, and a stator winding mounted to said stator core;
   at least one brush for supplying electric current from an electric power supply to said rotor coil;
   a brush holding assembly secured to said case, said brush holding assembly comprising a holding portion housing said brush, and a cover disposed on a head portion of said holding portion and capable of being opened to remove said brush;
   a brush terminal electrically connected to said brush; and
   an open portion for removal and insertion of said brush being formed at a position on said case facing said cover,
   wherein said brush holding assembly includes a holding assembly terminal, said holding assembly terminal and said brush terminal are electrically connected by a connection member, and said holding assembly terminal, said brush terminal and said connection member are covered by said cover which is exposed in said open portion.

2. The alternator according to claim 1 wherein said brush holding assembly extends to a vicinity of said open portion.

3. The alternator according to claim 1, wherein said connection member is a screw.

4. The alternator according to claim 3, wherein said screw is inserted into and removed from a connection portion where said holding assembly terminal and said brush terminal are connected in a circumferential direction relative to said rotor.

5. The alternator according to claim 3, wherein said screw is inserted into and removed from a connection portion where said holding assembly terminal and said brush terminal are connected in an axial direction relative to said rotor.

6. The alternator according to claim 1 wherein a regulator for adjusting a magnitude of an alternating voltage generated in said stator and a cooling plate placed in contact with said regulator are disposed on said brush holding assembly so as to overlap in an axial direction relative to said rotor.

7. The alternator according to claim 1 wherein a conducting wire of said stator winding extends outwards in an axial direction from an end surface of said stator core and is formed into coil ends having a uniform shape in a circumferential direction.

8. The alternator according to claim 1, further comprising a cap member removably mounted over said open portion for allowing access to said brush holding assembly via said open portion.

* * * * *